Dec. 3, 1968 J. T. JOCKEL 3,414,523
DISPOSAL OF WASTE OIL EMULSIONS
Filed Sept. 30, 1964
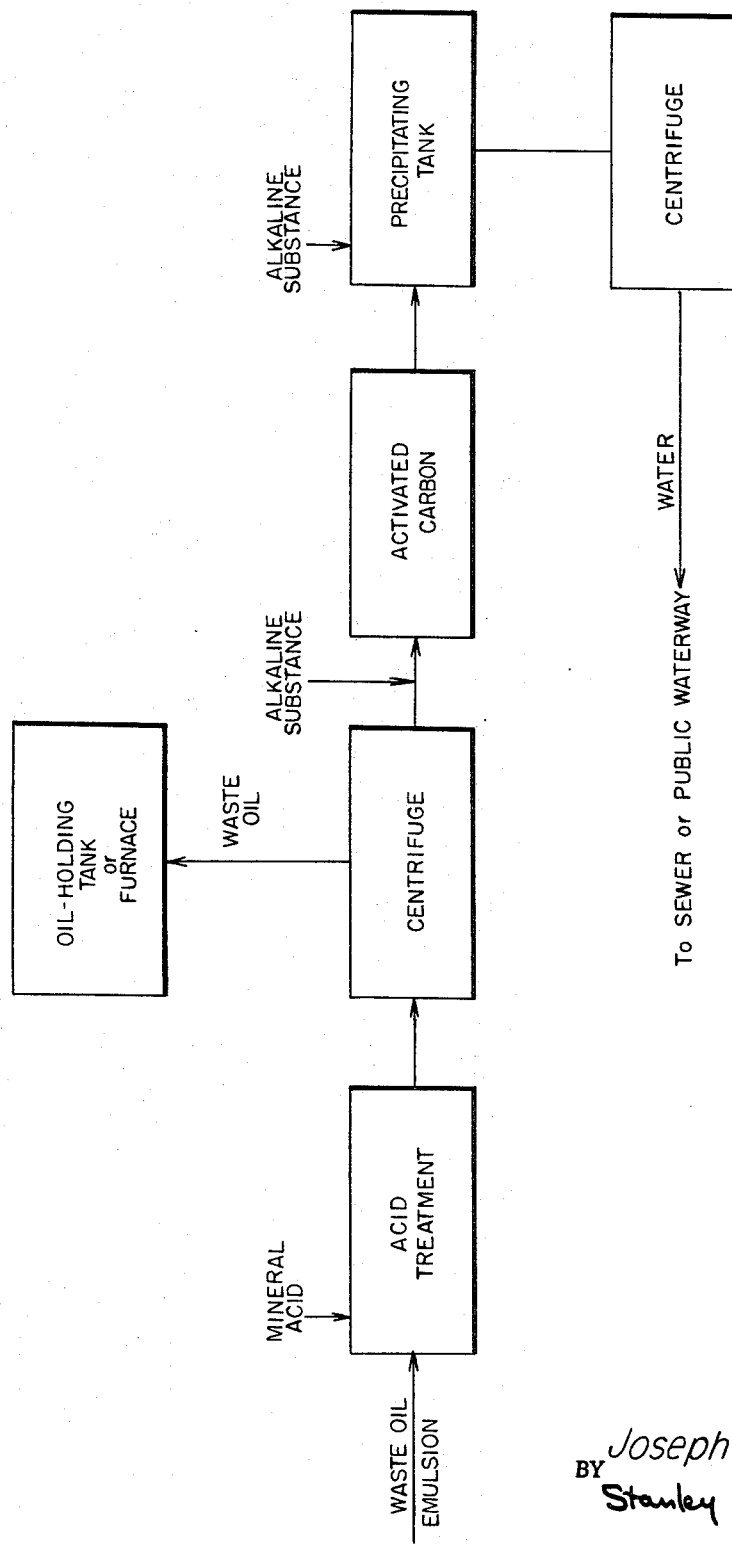
INVENTOR.
Joseph T. Jockel
BY Stanley A. Strober
Attorney

United States Patent Office 3,414,523
Patented Dec. 3, 1968

3,414,523
DISPOSAL OF WASTE OIL EMULSIONS
Joseph T. Jockel, River Vale, N.J., assignor to Mobil Oil Corporation, a corporation of New York
Filed Sept. 30, 1964, Ser. No. 400,345
13 Claims. (Cl. 252—324)

ABSTRACT OF THE DISCLOSURE

A process for disposing of waste oil-in-water emulsions by acidifying the emulsion, centrifuging the resulting emulsion to separate an oil phase which is recovered and a water phase, passing the water phase through an adsorbent and treating it with a base and disposing of the treated water phase.

---

This invention relates to a method of disposing of waste oils, and in particular it relates to a method of continuously disposing of waste roll oil emulsions.

The pollution of public waterways is a constant concern to manufacturers with regard to the disposal of industrial waste, particularly of waste oils. The quantity of foreign matter which may be introduced into rivers and streams is being continually decreased by governmental restrictions. The concentration of oil in effluent plant streams entering public waterways, in some cases, may be no greater than 20 parts per million. The metal rolling industry, for example, uses oil and water emulsions containing from about 50,000 to 100,000 parts per million of oil. Emulsions at these concentrations of oil cannot, therefore, be passed directly into a public waterway without prior treatment.

It has hitherto been the practice to transfer the waste oil emulsions to one or more large settling tanks capable of holding from 50,000 to 100,000 gallons. There they are treated with an acid or acid salt, such as alum, and allowed to settle into separate oil and water phases. This settling may take from a few days to almost two weeks. Frequently, the large tanks have to be heated to as high as 180° F. to hasten the settling. At the end of this extensive period, the water phase, still containing non-oil impurities, is passed into the nearest sewer or directly into a waterway. The oil phase, usually containing up to 40% by weight of water and often still emulsified, is transferred to nearby lagoons or open pits. This means of disposing of waste oil not only requires a large capital expenditure for extra settling tanks and for heating facilities, it also takes up valuable land which could be used for more productive purposes. If these pits are near rivers or streams, there is a danger that seepage may cause pollution of these public waterways. Moreover, if the oil is to be burned off as a means of final disposal, the burning may also create an air-pollution problem. Another difficulty with this procedure is that oil containing 5% or more water cannot be burned and hence must undergo further separation therefrom before final disposal.

Clearly this serious problem which has existed for many years must be more efficiently dealt with. Therefore, a major object of this invention is to provide a process of separating waste oil-and-water emulsions. Another object is to provide a process of separating waste oil emulsion without requiring long settling times. A further object is to provide a method of rapidly separating a waste oil emulsion into disposable components. A still further object is to provide a process of continuously disposing of waste roll oil emulsion.

The aforementioned and other objects I achieve by acidifying a waste oil emulsion and thereafter subjecting the said acidified emulsion to centrifuging at room temperature. Preferably, a waste roll oil emulsion containing, by weight of total emulsion, from about 90% to 95% of water and from about 10% to about 5% of oil and typical oil additives may be disposed of by the steps of (1) adding a mineral acid to the emulsion; (2) subjecting the acid-treated emulsion to centrifuging, and removing the oil phase; (3) adding to the remaining water phase an inorganic alkaline substance, while keeping the pH below neutral; (4) passing the water phase through a bed of activated carbon; (5) adding an inorganic alkaline substance, increasing the pH of the material to above neutral; and (6) subjecting the water phase to centrifuge.

If desired, the first alkalizing treatment (step 3) may be performed prior to centrifuging (step 2) to avoid contacting the centrifuge surfaces with highly acidic materials. Regardless of which alternative procedure is used, the first centrifuge step should be performed as soon as possible after the acidification or acidification-alkalization treatment.

The water phase taken from the centrifuge is then passed through a bed of activated carbon, after which the pH is raised once more by a further addition of the inorganic alkaline substance and finally centrifuged.

I have found that by the process of this invention the effluent water phase contains less than 20 p.p.m. of oil and usually is as low as about 5 to 10 p.p.m. and it is almost entirely free of other impurities. This water phase may be safely passed into public waterways. Surprisingly, the oil phase contains less than 5% by weight of water and may be burned off easily in controlled in-plant equipment, thereby avoiding the fire hazard and air-pollution of open-pit burning.

While the process of this invention may be conveniently used in batch-type disposal equipment, the preferred manner of employing the process is in a system for continuously disposing of the waste oil emulsions. A typical continuous process utilizing the steps of this invention may be more readily seen by referring to the accompanying diagram. An oil emulsion, composed of about 90% by weight of water and about 10% by weight of oil, oil additives and impurities and having a pH of about 8.5, is first mixed with a sufficient amount of a mineral acid to provide a resulting pH of about 1.0 to 3.0, and preferably about 2.0. The amount of mineral acid added is usually in the range of about 0.5% to 1.5% by volume of the total emulsion. This acidified stream is sent into a centrifuge similar to that used in cream separators, the centrifuge bowl being rotated at about 12,000 r.p.m. This rate may be increased or decreased depending upon the rate of separation desired or the quantity of emulsion being separated. The capacity of the centrifuge permitted an overall mass flow rate through the system of about 20 gallons per minute. A group of centrifuges arranged in a parallel flow may be used to increase the flow rate. Two separate liquid stream are taken off at the discharge end. The oil stream, containing less than 5%, and sometimes as low as about 1% to 2%, by weight of water, may be sent to a remelt furnace or to an oil storage tank. The water stream, usually containing no more than 5 to 10 p.p.m. of oil, is advanced further in the process.

An inorganic alkaline substance, such as an aqueous caustic solution, is added to the water stream whereby the pH of the treated stream is raised to about 4.0 to 5.0. The stream is passed through a bed of activated carbon. The effluent stream from the carbon treatment is then passed into a precipitating, or hold-up, tank to which a further amount of alkaline substance is added to increase the pH to between about 8.0 and 9.0. This treated stream is then passed through a centrifuge as the final step. The effluent water from the second centrifuge is usually very clean and clear.

The acidification step and the two alkalization steps may be performed in separate mixing tanks if desired, prior to each separation step. Preferably, the pH-controlling agents are added directly into the moving stream prior to entering the centrifuge as in the case of the acidic component and upon leaving the centrifuge and prior to entering the carbon bed, as in the case of the alkaline component. Excellent mixing of the agents with the various streams is thus readily obtained from the liquid flow in the pipes or conduits or from agitation or turbulence derived from movement through the separation equipment. By this use of a step-wise control of pH and successive removal of specific impurities from the discharging stream, the waste emulsion may be continuously and rapidly disposed of without resorting to large settling tanks or causing long hold-up times. While sufficient quantities of the oil are removed in the first centrifuging step, leaving less than 20 p.p.m. in the water, the water phase may still have dissolved or suspended therein impurities from the milling operation, such as certain oil additives, which are not removable in the first centrifuging step and perhaps a number of color-bearing impurities. Almost all of these color-bodies are adsorbed on the surface of the carbon. Preferably the passage of the stream through the carbon bed is by gravity. However, if desired, the stream may be passed through more rapidly, for example, by pumping.

Prior to the final centrifuging step, the pH of the water stream is increased to above neutral and preferably to a range of 8.0 to 9.0. Remaining impurities, believed to be dissolved salts, such as aluminum and iron sulfates, are thereby precipitated, preferably by mixing the water and the alkaline substance in a hold-up tank or other receiving vessel. The final centrifuging step removes the precipitated solids, as well as any of the fine metal particles retained from the milling operation. Occasionally, the water stream from the first centrifuging step is so clear and free of color bodies that the only steps required are to advance the stream to the hold-up tank, increase the pH from 2.0 to above neutral, and then pass the stream on to the second centrifuge.

The mineral acid which may be used for the initial treatment of the waste oil include the strong acids, such as sulfuric acid, hydrochloric acid, and nitric acid. As to the alkaline substance, the alkali metal hydroxides and carbonates are used, such as sodium hydroxide, potassium hydroxide, and sodium carbonate. Aqueous solutions of these above agents are the most convenient to use to obtain more rapid mixing with the emulsion.

COMPARATIVE EXAMPLES

A waste roll oil emulsion, containing about 95% by weight of water and about 5% by weight of oil and oil soluble additives, was treated in equal amounts both by the settling procedure heretofore practiced and by the method of this invention. The oil portion consisted of the following typical components in the approximate proportions indicated.

| Component: | Percent by Wt. |
|---|---|
| Mixture of refined paraffinic and naphthenic oils | 79.75 |
| Anionic soap (emulsifying agent) | 18.50 |
| Tricresyl phosphate (extreme pressure agent) | 1.50 |
| Phenol (bactericide) | 0.25 |

The pH of the emulsion was about 8.5.

Example I

*Settling method.*—The waste oil emulsion was added to a series of glass-lined tanks and treated with various amounts of sulfuric acid, by volume of emulsion, at temperatures of 68° F. and 180° F. Each oil had had different lengths of service time in a typical aluminum rolling mill. The treated oil emulsion was allowed to remain undisturbed in the tanks until separation occurred.

Table I shows that at approximately room temperature, using 1% by volume of sulfuric acid, the separation takes about two days regardless of temperature. Furthermore, with room temperature settling, the separation of the phases is poor. Although the elevated temperature improved the quality of the separation, there was no shortening of the settling time. Moreover, the water phase was found to contain objectionable contamination evidenced by a yellow color.

TABLE I

| Sulfuric Acid, percent by vol. | Time in Service, Weeks | Settling Temp. ° F. | Settling Time, Days | Rating of Separation [1] | |
|---|---|---|---|---|---|
| | | | | Oil Phase | Water Phase |
| 2 | 16 | 68 | 11 | Poor | Poor. |
| 2 | 16 | 180 | 2 | Good | Good. |
| 3 | 16 | 180 | 6 | Poor | Poor. |
| 1 | 4 | 68 | 2 | do | Do. |
| 1 | 4 | 180 | 2 | Good | Good. |
| 1 | 2 | 68 | 2 | Poor | Poor. |
| 1 | 2 | 180 | 2 | Good | Good. |

[1] Rating of Separation.—Oil Phase: Poor, more than 5% by weight of water; Good, less than 5% by weight of water; Water Phase: Poor, more than 20 p.p.m. of oil; Good, less than 20 p.p.m. of oil.

Example II

*Centrifuge process.*—The oil emulsion used in Example I was treated with 1% by volume sulfuric acid and immediately passed into a centrifuge rotating at 12,000 r.p.m. The temperature was maintained at approximately room temperature (68° to 70° F.). Regardless of the length of service in the aluminum rolling mill, the total time in the centrifuge was only five minutes and the separation of the phases was considered good. The water phase was subsequently treated with enough caustic solution to increase the pH to about 5.0. This stream of water was passed through a bed of activated carbon and more caustic was added to raise the pH to 8.5. At this point, heavy flocculation occurred and this matter was removed by centrifuging a second time. The resulting water was crystal clear. Table II below is a tabulation of the results of the procedure.

TABLE II

| Sulfuric Acid, percent by vol. | Time in Service, Weeks | Centrifuging Temp., ° F. | Centrifuging Time, Minutes | Rating of Separation [1] | |
|---|---|---|---|---|---|
| | | | | Oil Phase | Water Phase |
| 1 | New | 70 | 5 | Good | Good. |
| 1 | 4 | 70 | 5 | do | Do. |
| 1= | 8 | 68 | 5 | do | Do. |
| 1 | 10 | 68 | 5 | do | Do. |
| 1 | 16 | 68 | 5 | do | Do. |

[1] Rating of Separation.—Oil Phase: Poor, more than 5% by weight of water; Good, less than 5% by weight of water; Water Phase: Poor, more than 20 p.p.m. of oil; Good, less than 20 p.p.m. of oil.

The method of this invention is so effective that not only may rolling mill owners save the expense of acquiring nearby land to dump large amounts of waste oil, but they may also avoid having to employ extra holding tanks for the settling of the emulsion. Waste oil can be disposed of daily, as in the case of skimmings, the effluent water being at safe limits for passage into public waterways. It has also been found that the oil phase which contains less than 5% by weight of water, may be burned inside the plant thereby avoiding pollution of the air.

It is to be understood that the examples and the specific compositions herein are illustrative only and are not to be construed as limiting the scope of this invention. The emulsion compositions disclosed are deemed to be typical of all oil emulsions which may be used in this invention.

I claim:
1. A method of treating a waste oil-in-water emulsion comprising the steps of:
   (1) treating the emulsion with a mineral acid to provide a pH of about 1.0 to 3.0;

(2) subjecting the said acid-treated emulsion to centrifuging, and removing the oil phase;
(3) adding to the remaining water phase an alkali metal base thereby increasing the pH thereof to over the pH of the emulsion of step (2) and below 7.0;
(4) passing the said water phase through a bed of activated carbon;
(5) adding a further amount of an alkali metal base, thereby increasing the pH of the said water phase to above neutral; and
(6) subjecting the said water phase to centrifuging.

2. The method of claim 1 wherein the pH of the emulsion after the treatment with the acid of step (1) is 2.0.

3. The method of claim 1 wherein the mineral acid of step (1) is selected from the group consisting of sulfuric acid, hydrochloric acid and nitric acid.

4. The method of claim 3 wherein the mineral acid is sulfuric acid.

5. The method of claim 1 wherein the alkali metal base of steps (3) and (5) is selected from the group consisting of an alkali metal hydroxide and an alkali metal carbonate.

6. The method of claim 5 wherein the alkali metal base is sodium hydroxide.

7. The method of claim 1 wherein the addition of the alkali metal base of step (3) is performed prior to the centrifuging step of step (2).

8. The method of claim 1 wherein the pH of the water phase of step (3) after addition of the alkali metal base is from about 4.0 to about 5.0.

9. The method of claim 1 wherein the oil-in-water emulsion consists of about 90% to about 95% by weight of the water phase and from 10% to about 5% by weight of the oil phase.

10. The method of claim 1 wherein the addition of the alkali metal base of step (5) causes precipitation of solids which are removed by the centrifuging step of step (6).

11. The method of claim 1 wherein the pH of the water phase of step (6) after addition of the alkali metal base is about 8.0 to 9.0.

12. A method of continuously separating the phases of a waste oil emulsion, containing by weight of total emulsion about 90% of water and about 10% of oil, comprising the steps of:
(1) treating the said emulsion with from about 0.5% to 1% by volume of sulfuric acid, whereby the pH of the said emulsion is about 2.0;
(2) passing the said acid-treated emulsion through a centrifuge and removing the oil phase;
(3) mixing into the remaining water stream an amount of sodium hydroxide sufficient to raise the pH of the said stream to a range of 4.0 to 5.0;
(4) passing the treated water stream through a bed of activated carbon;
(5) passing the water stream from the said carbon bed into a receiving vessel, and mixing therewith sufficient sodium hydroxide to increase the pH of the said water to about 8.5; and
(6) subjecting the said treated water stream to centrifuging.

13. The method of claim 12, wherein the rate of flow in the moving streams is at an overall rate of about 20 gallons per minute.

References Cited

UNITED STATES PATENTS

| | | | |
|---|---|---|---|
| 1,373,773 | 4/1921 | Sharples | 252—349 X |
| 2,217,387 | 10/1940 | Shapiro | 252—330 X |
| 2,566,980 | 10/1951 | Catanach et al. | 252—330 |
| 2,613,181 | 10/1952 | Green et al. | 210—39 X |
| 2,740,804 | 4/1956 | Glazier | 252—330 X |

OTHER REFERENCES

Berkman et al.: Emulsions and Foams, pub. 1941, 291, 292, 372, 377 and 378.

HERBERT B. GUYNN, *Primary Examiner*.